US012756089B2

(12) United States Patent
Miyazaki et al.

(10) Patent No.: US 12,756,089 B2
(45) Date of Patent: Oct. 6, 2026

(54) TRANSPARENT ELECTROMAGNETIC WAVES CONTROLLING MEMBER

(71) Applicant: DAI NIPPON PRINTING CO., LTD., Tokyo (JP)

(72) Inventors: Yuichi Miyazaki, Tokyo (JP); Atsuo Nakamura, Tokyo (JP); Shigeki Kawano, Tokyo (JP)

(73) Assignee: Dai Nippon Printing Co., LTD., Tokyo (JP)

( * ) Notice: Subject to any disclaimer, the term of this patent is extended or adjusted under 35 U.S.C. 154(b) by 0 days.

(21) Appl. No.: 18/840,572

(22) PCT Filed: Feb. 28, 2023

(86) PCT No.: PCT/JP2023/007252

§ 371 (c)(1),
(2) Date: Aug. 22, 2024

(87) PCT Pub. No.: WO2023/163206

PCT Pub. Date: Aug. 31, 2023

(65) Prior Publication Data

US 2025/0192423 A1 Jun. 12, 2025

(30) Foreign Application Priority Data

Feb. 28, 2022 (JP) ................................ 2022-028989

(51) Int. Cl.
*H01Q 1/36* (2006.01)
*H01Q 3/46* (2006.01)
*H01Q 15/00* (2006.01)

(52) U.S. Cl.
CPC ......... *H01Q 1/364* (2013.01); *H01Q 15/0013* (2013.01)

(58) Field of Classification Search
CPC ....... H01Q 1/364; H01Q 3/46; H01Q 15/0013
See application file for complete search history.

(56) References Cited

U.S. PATENT DOCUMENTS

2010/0220036 A1 9/2010 Maruyama et al.
2011/0210906 A1 9/2011 Maruyama et al.
(Continued)

FOREIGN PATENT DOCUMENTS

GB 2 452 665 A 3/2009
JP 2008-219125 A 9/2008
(Continued)

OTHER PUBLICATIONS

Japanese Patent No. 5371633 B2 (Ref. AD) is discussed at paragraph [0002] of the present specification and corresponds to U.S. Patent Application Publication No. 2010/0220036 A1 (Ref. AA).
Japanese Patent No. 5162677 B2 (Ref. AE) is discussed at paragraph [0002] of the present specification and corresponds to U.S. Patent Application Publication No. 2011/0210906 A1 (Ref. AB).
International Publication No. WO 2007/142125 A1 (Ref. AF) corresponds to British Patent Application Publication No. 2 452 665 A (Ref. AG).
(Continued)

*Primary Examiner* — Hoang V Nguyen
(74) *Attorney, Agent, or Firm* — Muncy, Geissler, Olds & Lowe, P.C.

(57) ABSTRACT

The present disclosure provides a transparent electromagnetic waves controlling member transmitting visible light and controlling a reflection direction or a transmission direction of electromagnetic waves in a particular frequency band, the transparent electromagnetic waves controlling member comprising: a dielectric substrate transmitting visible light; a plurality of resonant elements placed on at least one surface of the dielectric substrate, transmitting visible light and resonating with the electromagnetic waves; and a dummy pattern placed on at least one surface of the dielectric substrate, placed in a region other than a region where the plurality of resonant elements is placed, and transmitting visible light, wherein a size of the dummy pattern is 0.1 times or less of a wavelength of the electromagnetic waves.

13 Claims, 8 Drawing Sheets

(56) References Cited

U.S. PATENT DOCUMENTS

| | | | |
|---|---|---|---|
| 2018/0316365 | A1 | 11/2018 | Völkel et al. |
| 2020/0158634 | A1 | 5/2020 | Wang et al. |
| 2020/0373653 | A1 | 11/2020 | Suzuki et al. |

FOREIGN PATENT DOCUMENTS

| | | | | | |
|---|---|---|---|---|---|
| JP | 5162677 | B2 | | 3/2013 | |
| JP | 5371633 | B2 | | 12/2013 | |
| JP | 2020520611 | A | * | 7/2020 | ........... H01Q 21/065 |
| WO | WO 96/31918 | A1 | | 10/1996 | |
| WO | 2007/142125 | A1 | | 12/2007 | |
| WO | 2019/107476 | A1 | | 6/2019 | |

OTHER PUBLICATIONS

International Publication No. WO 2019/107476 A1 (Ref. AH) corresponds to U.S. Patent Application Publication No. 2020/0373653 A1 (Ref. AC).

Non-Patent Literature Reference Matsuno (Ref. AJ) is discussed at paragraph [0004] of the present specification.

Hiromi Matsuno, et al., "Visible Light Transfer Meta-Surface Reflectors," The Institute of Electronics, Information and Communication Engineers, *IEICE Technical Report*, 2020, vol. 120, No. 9, pp. 13-17 (5 pages).

International Search Report and Written Opinion (Application No. PCT/JP2023/007252) dated May 16, 2023 (10 pages).

* cited by examiner

TRANSPARENT ELECTROMAGNETIC WAVES CONTROLLING MEMBER

TECHNICAL FIELD

The present disclosure relates to an electromagnetic waves controlling member controlling a reflection direction or a transmission direction of the electromagnetic waves in a particular frequency band.

BACKGROUND ART

To improve the propagation environment and area in a mobile communication system, a technique of the electromagnetic waves controlling member such as a reflect array and a transmit array has been considered (for example, Patent Documents 1 and 2, and Non-Patent Document 1). Particularly, since high frequency radio waves, such as those used in fifth generation mobile communication systems (5G), tend to travel straight, resolution of coverage holes (regions where radio waves do not reach) is an important issue.

Here, in the mobile communication system, a variety of situations are assumed in a relationship between a position of a base station, a position of a coverage hole, and an installation location of the reflect array or the transmit array. However, there are problems that a view may be spoiled depending on the installation location of the reflect array or the transmit array; and that the installation location of the reflect array or the transmit array is limited in the first place.

Therefore, in recent years, reflect arrays and transmit arrays that are transparent and do not affect the view have been developed (for example, Non-Patent Document 1).

CITATION LIST

Patent Documents

Patent Document 1: Japanese Patent No. 5371633
Patent Document 2: Japanese Patent No. 5162677

Non-Patent Document

Non-Patent Document 1: Hiromi MATSUNO et. Al. "Visible Light Transfer Meta-surface Reflectors", THE INSTITUTE OF ELECTRONICS, INFORMATION AND COMMUNICATION ENGINEERS, IEICE Technical Report, 2020, Vol. 120, No. 9, pp. 13-17

SUMMARY OF DISCLOSURE

Technical Problem

It is desired that the reflect array or the transmit array be capable of reflecting or transmitting electromagnetic waves in a desired direction relative to electromagnetic waves in a particular frequency incident from a base station in a predetermined direction. For such reflect arrays and transmit arrays, for example, techniques described below have been developed: a plurality of resonant elements is arranged on a dielectric substrate, and by varying size or shape of the respective resonant elements, resonant frequency of the respective resonant elements and reflection phase or transmission phase of the electromagnetic waves are controlled, thereby an incident direction and a reflection direction or a transmission direction of the electromagnetic waves are controlled.

A transparent conductive layer and a conductive mesh may be used as the resonant element in a transparent reflect array and a transparent transmit array. However, there is a problem that the pattern of the resonant element may be seen visually due to the difference in transmittance, reflectance, and refractive index, for example, between a portion where the resonant element exists, and a portion where no resonant element exists.

Therefore, in order to approximate the transmittance, the reflectance, and the refractive index, for example, of the portion where the resonant element exists, and the portion where no resonant element exists, the transparent conductive layer or the conductive mesh may be placed also in the portion where no resonant element exists. However, when the transparent conductive layer or the conductive mesh is placed in the portion where no resonant element exists, the transparent conductive layer or the conductive mesh will also resonate with the electromagnetic waves, causing a problem that the properties of the reflect array or the transmit array will change due to interference.

The present disclosure has been made in view of the above circumstances, and an object of the present disclosure is to provide, in a transparent electromagnetic waves controlling member, an electromagnetic wave controlling member capable of making the resonant element pattern invisible without affecting the properties of the electromagnetic waves controlling member.

Solution to Problem

One embodiment of the present disclosure provides a transparent electromagnetic waves controlling member transmitting visible light and controlling a reflection direction or a transmission direction of electromagnetic waves in a particular frequency band, the transparent electromagnetic waves controlling member comprising: a dielectric substrate transmitting visible light; a plurality of resonant elements placed on at least one surface of the dielectric substrate, transmitting visible light and resonating with the electromagnetic waves; and a dummy pattern placed on at least one surface of the dielectric substrate, placed in a region other than a region where the plurality of resonant elements is placed, and transmitting visible light, wherein a size of the dummy pattern is 0.1 times or less of a wavelength of the electromagnetic waves.

Another embodiment of the present disclosure provides a transparent electromagnetic waves controlling member transmitting visible light and controlling a reflection direction or a transmission direction of electromagnetic waves in a particular frequency band, the transparent electromagnetic waves controlling member comprising: a dielectric substrate transmitting visible light; a plurality of resonant elements placed on at least one surface of the dielectric substrate, transmitting visible light and resonating with the electromagnetic waves; and a dummy pattern placed on at least one surface of the dielectric substrate, placed in a region other than a region where the plurality of resonant elements is placed, transmitting visible light, and including non-conductive material.

Another embodiment of the present disclosure provides a transparent substrate with a transparent electromagnetic waves controlling member comprising: a transparent substrate; and the transparent electromagnetic waves controlling member described above placed on one surface of the transparent substrate.

Advantageous Effects of Disclosure

The transparent electromagnetic waves controlling member in the present disclosure has an effect that it is capable of making the resonant element patterns invisible without affecting the properties of the transparent electromagnetic waves controlling member.

DESCRIPTION OF EMBODIMENTS

Figure 1A:
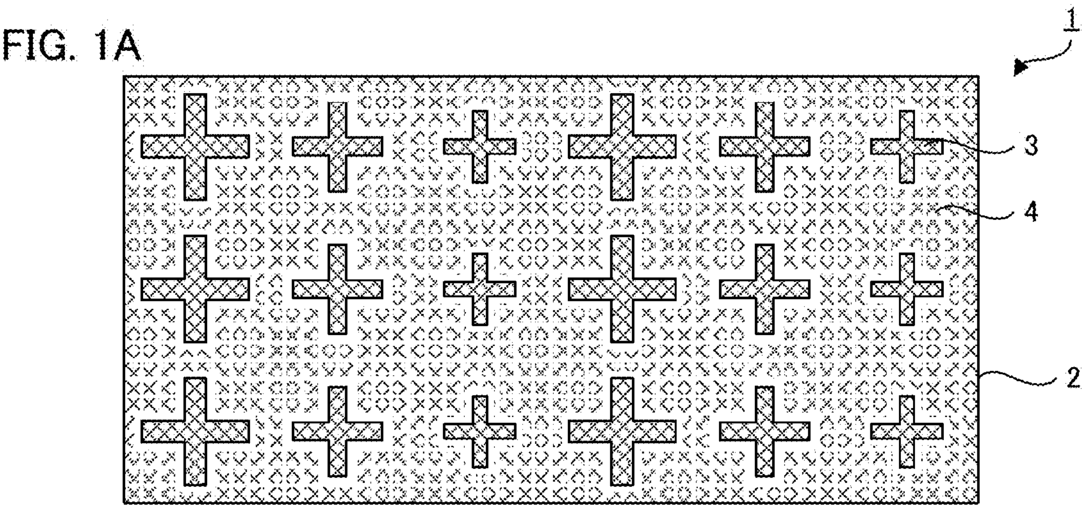
FIGS. 1A and 1B are schematic plan views illustrating an example of a transparent electromagnetic waves controlling member in the present disclosure.

Embodiments in the present disclosure are hereinafter explained with reference to, for example, drawings. However, the present disclosure is implemented in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present descriptions and each drawing, for the factor same as that described in the figure already explained, the same reference sign is indicated and the detailed explanation thereof may be omitted.

In the present descriptions, in expressing an aspect wherein some member is placed on the other member, when described as merely "above" or "below", unless otherwise stated, it includes both of the following cases: a case wherein some member is placed directly on or directly below the other member so as to be in contact with the other member, and a case wherein some member is placed on or below the other member via yet another member. In expressing an aspect wherein some member is placed on the upper side of the other member, when described as merely "upper side" or "lower side", unless otherwise stated, it includes all of the following cases: a case wherein some member is placed directly on or directly below the other member so as to be in contact with the other member; a case wherein some member is placed on or below the other member via yet another member; and a case wherein some member is placed on the upper side or the lower side of the other member via a space. Also, in the present descriptions, in expressing an aspect wherein some member is placed on the surface of the other member, when described as merely "on the surface", unless otherwise stated, it includes both of the following cases: a case wherein some member is placed directly on or directly below the other member so as to be in contact with the other member, and a case wherein some member is placed on or below the other member via yet another member.

A transparent electromagnetic waves controlling member and a transparent substrate with a transparent electromagnetic waves controlling member in the present disclosure are hereinafter described in detail.

A. Transparent Electromagnetic Waves Controlling Member

The transparent electromagnetic waves controlling member in the present disclosure transmits visible light and controls a reflection direction or a transmission direction of electromagnetic waves in a particular frequency band, the transparent electromagnetic waves controlling member comprises: a dielectric substrate transmitting visible light; a plurality of resonant elements placed on at least one surface of the dielectric substrate, transmitting visible light, and resonating with the electromagnetic waves; and a dummy pattern placed on at least one surface of the dielectric substrate, placed in a region other than a region where the plurality of resonant elements is placed, and transmitting visible light.

Figure 1B:
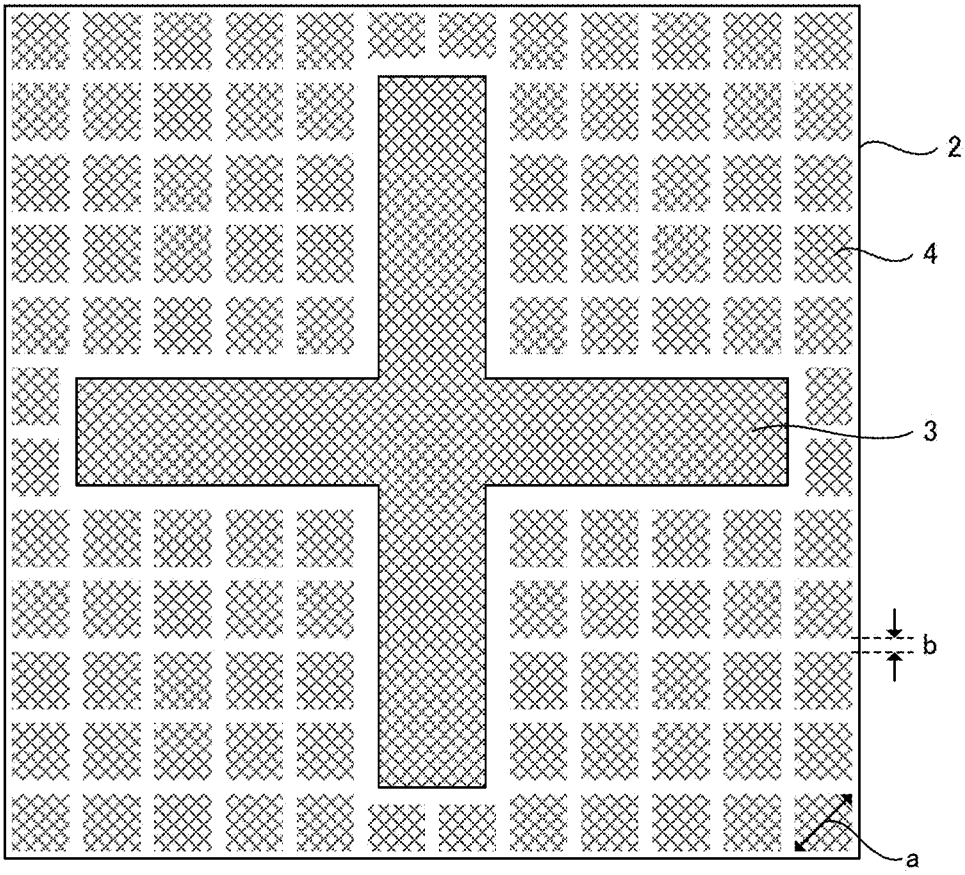

The transparent electromagnetic waves controlling member in the present disclosure will be described, referring to drawings. FIGS. 1A and 1B are schematic plan views illustrating an example of the transparent electromagnetic waves controlling member in the present disclosure; and FIG. 1B is an enlarged view of FIG. 1A. As shown in FIGS. 1A and 1B, the transparent electromagnetic waves controlling member 1 transmits visible light and controls a reflection direction or a transmission direction of electromagnetic waves in a particular frequency band, the transparent electromagnetic waves controlling member comprises: a dielectric substrate 2 transmitting visible light; a plurality of resonant elements 3 placed on at least one surface of the dielectric substrate 2, transmitting visible light, and resonating with the electromagnetic waves in the particular frequency band; and dummy patterns 4 placed on at least one surface of the dielectric substrate 2, placed in a region other than a region where the plurality of resonant elements 3 is placed, and transmitting visible light.

In the example shown in FIGS. 1A and 1B, the resonant element 3 includes a mesh structure constituted from a conductive mesh, and the dummy pattern 4 includes a mesh pattern constituted from a conductive mesh. Thereby, the resonant element 3 and the dummy pattern 4 are able to transmit visible light.

In the present disclosure, since the dummy patterns 4 are placed in the region other than the region where the plurality of resonant elements 3 is placed, the difference of the visible light transmittance, between the region where the resonant elements 3 are placed and the region where the dummy patterns 4 are placed, may be decreased. Thereby, the visibility of the resonant element 3 patterns may be decreased, and it is possible to make the resonant element 3 patterns invisible. Therefore, the transparent electromagnetic waves controlling member may be installed, for example, without spoiling the cityscape or the appearance of buildings, and without spoiling the indoor viewings. Further, it will be easier to ensure a place to install the transparent electromagnetic waves controlling member.

Also, in the example shown in FIG. 1B, since the dummy patterns 4 are divided into a plurality of portions, a size "a"

of the dummy pattern 4 (in FIG. 1B, the length of the diagonal line of the rectangular dummy pattern 4) is a size that does not resonate with electromagnetic waves in a particular frequency band, specifically, the size sufficiently smaller than the wavelength of the electromagnetic waves, the dummy pattern 4 may be suppressed from resonating with the electromagnetic waves in a particular frequency band.

As described above, in the present disclosure, since the dummy pattern 4 does not resonate with the electromagnetic waves in the particular frequency band, it is capable of making the resonant element 3 patterns invisible without changing the properties of the transparent electromagnetic waves controlling member 1.

Figure 2:
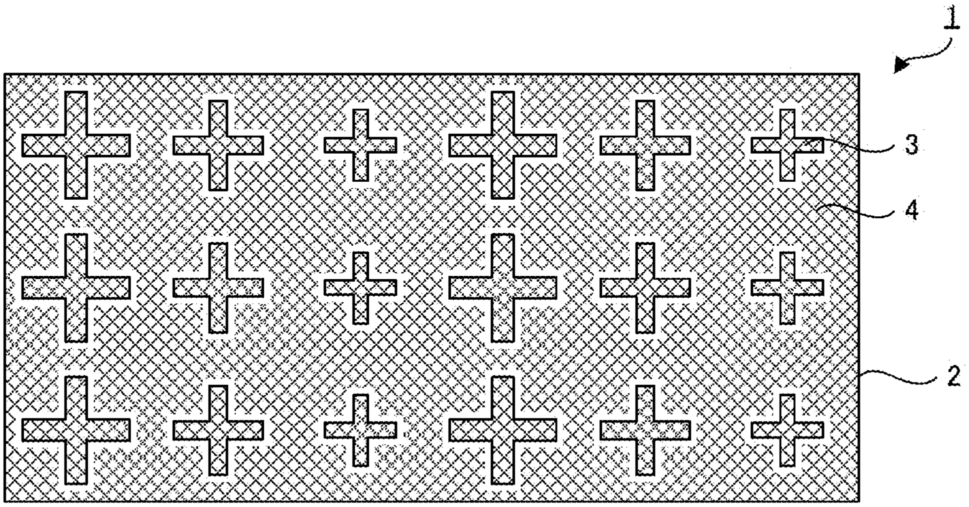
FIG. 2 is a schematic plan view illustrating an example of a transparent electromagnetic waves controlling member in the present disclosure.

FIG. 2 is a schematic plan view illustrating another example of a transparent electromagnetic waves controlling member in the present disclosure. Similar to the transparent electromagnetic waves controlling member 1 shown in FIGS. 1A and 1B, the transparent electromagnetic waves controlling member 1 shown in FIG. 2 transmits visible light and controls a reflection direction or a transmission direction of electromagnetic waves in a particular frequency band, the transparent electromagnetic waves controlling member comprises: a dielectric substrate 2 transmitting visible light; a plurality of resonant elements 3 placed on at least one surface of the dielectric substrate 2, transmitting visible light, and resonating with the electromagnetic waves in the particular frequency band; and dummy pattern 4 placed on at least one surface of the dielectric substrate 2, placed in a region other than a region where the plurality of resonant elements 3 is placed, and transmitting visible light.

In the example shown in FIG. 2, the resonant element 3 incudes a mesh structure constituted from a conductive mesh, and the dummy pattern 4 includes a mesh pattern. Thereby, the resonant element 3 and the dummy pattern 4 are able to transmit visible light.

Also, in the example shown in FIG. 2, the dummy pattern 4 includes non-conductive material. This prevents the dummy pattern 4 from resonating with electromagnetic waves in a particular frequency band.

In such aspect as well, the visibility of the resonant element 3 patterns may be decreased, and it is possible to make the resonant element 3 patterns invisible by placing the dummy pattern 4 in the region other than the region where the plurality of resonant elements 3 is placed. Also, since the dummy pattern 4 does not resonate with electromagnetic waves in a particular frequency band, it is capable of making the resonant element 3 patterns invisible without changing the properties of the electromagnetic waves controlling member 1.

Each constitution of the transparent electromagnetic waves controlling member in the present disclosure is hereinafter described.

1. Visible Light Transmittance

The transparent electromagnetic waves controlling member in the present disclosure transmits visible light. Also, in the present disclosure, all of the resonant element, the dummy pattern, and the dielectric substrate transmit visible light. In the transparent electromagnetic waves controlling member in the present disclosure, the visible light transmittance of a region where the plurality of resonant elements is placed, and the visible light transmittance of a region where the dummy pattern is placed are preferably approximately equal. Thereby, the visibility of the resonant element patterns may further be decreased.

Incidentally, the visible light transmittance of the region where the resonant elements are placed, and the visible light transmittance of the region where the dummy pattern is placed being approximately equal means that the difference between the visible light transmittance of the region where the resonant elements are placed, and the visible light transmittance of the region where the dummy pattern is placed is within 2.5%. The difference of the visible light transmittance is preferably, for example, within 2.5%, more preferably within 1.2%, and further preferably within 0.6%.

Also, the visible light transmittance of the region where the resonant elements are placed is preferably, for example, 50% or more, more preferably 60% or more, and may be 70% or more.

Also, the visible light transmittance of the region where the dummy pattern is placed is preferably, for example, 50% or more, more preferably 60% or more, and may be 70% or more.

Incidentally, in the present descriptions, "visible light transmittance" means the visible light transmittance determined in accordance with JIS R3106:2019.

Specifically, the visible light transmittance means the weighted average value obtained by multiplying the spectral transmittance from wavelength of 380 nm or more and 780 nm or less by the weighting factor obtained by the spectrum of CIE daylight D65 and the wavelength distribution of the spectral luminous efficiency of CIE light adaption. The measurement wavelength interval is 1 nm.

Also, the visible light transmittance of the region where the resonant element is placed is the average value of the measured values of 10 randomly selected locations. Similarly, the visible light transmittance of the region where the dummy pattern is placed is the average value of the measured values of 10 randomly selected locations.

In the transparent electromagnetic waves controlling member in the present disclosure, the color of the region where the resonant elements are placed, and the color of the region where the dummy pattern is placed are preferably close. Specifically, the color difference $\Delta E^*_{ab}$ in the L*a*b* color system, between the reflected light in the region where the resonant elements are placed and the reflected light in the region where the dummy pattern is placed, is preferably 2.5 or less, more preferably 1.2 or less, and further preferably 0.6 or less. When the color difference $\Delta E^*_{ab}$ is in the above range, the difference between the color of the region where the resonant elements are placed, and the color of the region where the dummy pattern is placed is less likely to be noticed so that the visibility of the resonant element pattern may further be decreased.

Here, the L*a*b* color system is the color system defined by the International Commission on Illumination (CIE) in 1976 and also specified in JIS Z8781-4. The color difference $\Delta E^*_{ab}$ is determined from the following formula.

$$\Delta E^*_{ab}=\{(\Delta L^*)^2+(\Delta a^*)^2+(\Delta b^*)^2\}^{1/2}$$

(In the above formula, ΔL* is the difference between the brightness L* of the region where the resonant elements are placed, and the brightness L' of the region where the dummy pattern is placed. Also, Δa* is the difference between the chromaticity a* of the region where the resonant elements are placed, and the chromaticity a* of the region where the dummy pattern is placed. Also, Δb* is the difference between the chromaticity b* of the region where the resonant elements are placed, and the chromaticity b* of the region where the dummy pattern is placed.)

The brightness L' and the chromaticity a*, b* of a reflected light in the region where the resonant elements are placed, and the reflected light in the region where the dummy pattern is placed, may be measured in accordance with JIS Z8722, using a spectrophotometer, by placing a white sheet on the rear surface of the transparent electromagnetic waves controlling member. The measurement conditions are D65 light source, field of view of 10°, and reflection measurement. For example, a device capable of measuring reflection such as "Spectrophotometric colorimeter CM-700d" from Konica Minolta Japan, Inc. may be used as a spectrophotometer. For example, a commercially available standard white sheet may be used as the white sheet, or a white sheet with a visually homogeneous color such as high-quality paper may be used. Also, considering the work of checking the visibility of the resonant element and the resonant pattern visually, the white sheet is preferably as large as possible so that the regions of both the resonant element and the dummy pattern may be placed in the same plane and compared, and in this regard, high-quality paper is suitable.

For example, in FIGS. 1A and 1B, when the resonant element 3 and the dummy pattern 4 include the same conductive material, in the formula described above, the terms $\Delta a^*$ and $\Delta b^*$ resulting from the reflection color of the conductive material are determined by the area ratio of the conductive material in each region, that is, the aperture ratio of the conductive mesh. Also, the term $\Delta L^*$ resulting from the transmission color of the dielectric substrate 2 is determined by the aperture ratio of the conductive mesh. That is, it means that the difference in transmittance, which is determined from the aperture ratio of the conductive mesh, substantially determines the color difference.

Also, in FIG. 2 for example, the resonant element 3 and the dummy pattern 4 include materials that differ from each other. In such cases, materials with similar colors are preferably used.

2. Resonant Element

The resonant element in the present disclosure is an element placed on at least one surface of the dielectric substrate, transmitting visible light, and resonating with the electromagnetic waves in a particular frequency band. Also, by changing the shape or the size of the resonant element, the resonant element has a function to resonate with the electromagnetic waves in a particular frequency band and controls the phase of the emitted electromagnetic waves. Also, by placing such resonant element properly in the plane of the electromagnetic waves controlling member, the incident electromagnetic waves into the electromagnetic waves controlling member may be reflected or transmitted. Further, by appropriately designing the distribution of the shape or the size of the resonant element, the reflection direction or the transmission direction of the incident electromagnetic waves from a predetermined direction may be controlled.

Here, whether the resonant element resonates with the electromagnetic waves in a particular frequency band under the condition where it is placed on at least one surface of the dielectric substrate, is checked by a measurement using a vector network analyzer. To measure the behavior of a single resonant element, or to measure the reflection behavior or the transmission behavior of a part or as a whole of the electromagnetic waves controlling member wherein the plurality of resonant elements is placed, a measurement method by a free space method suitable for the target sample may be selected, and properties such as the intensity and phase change of incident, reflected and transmitted electromagnetic waves, and their frequency dependence may be measured. At this time, when the peak or bottom of the S-parameter is confirmed within the range including the frequency of the target electromagnetic waves, it is regarded as a resonant element.

Also, since the resonant element functions according to the shape of a conductive pattern, for the pattern including conductive material such as a conductive mesh, whether the resonant element resonates with the electromagnetic waves in a particular frequency band may be easily estimated by measuring the shape or size of the pattern.

Incidentally, the size of the resonant element is the longest length in the resonant element pattern in a planar shape. For example, when the shape of the resonant element pattern in a plan view is rectangular, the size of the resonant element is the length of the diagonal line. Also, for example, when the shape of the resonant element pattern in a plan view is circular, the size of the resonant element is the diameter, and when the shape of the resonant element pattern in a plan view is elliptical, the size of the resonant element refers to the long diameter. Also, for example, when the shape of the resonant element pattern in a plan view is a ring, the size of the resonant element is the half of the length of the ring perimeter. Also, for example, when the shape of the resonant element pattern in a plan view is a cross, the size of the resonant element is the length of the longer line of the two lines.

Since the resonant element is usually designed taking the influence of the dielectric substance or the backside, and also the desired reflection properties or the desired transmission properties into account, the size of the resonant element is often 0.1 times or more and 0.5 times or less of the wavelength of the electromagnetic waves in a particular frequency band.

Examples of an aspect of the arranged resonant elements may include a frequency selective surface (FSS) which controls reflection or transmission of electromagnetic waves in a particular frequency band, and a so-called reflect array.

Figure 3A:
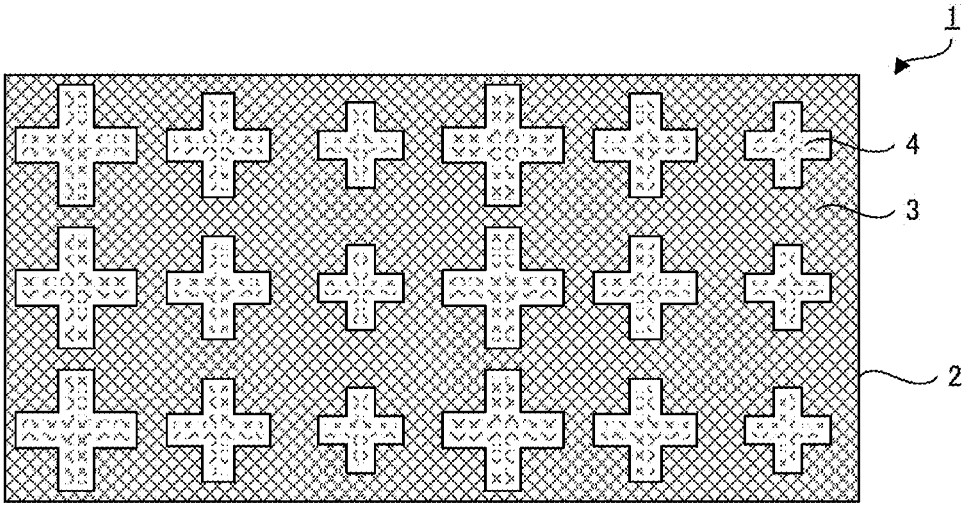
FIGS. 3A and 3B are schematic plan views illustrating an example of a transparent electromagnetic waves controlling member in the present disclosure.
Figure 3B:
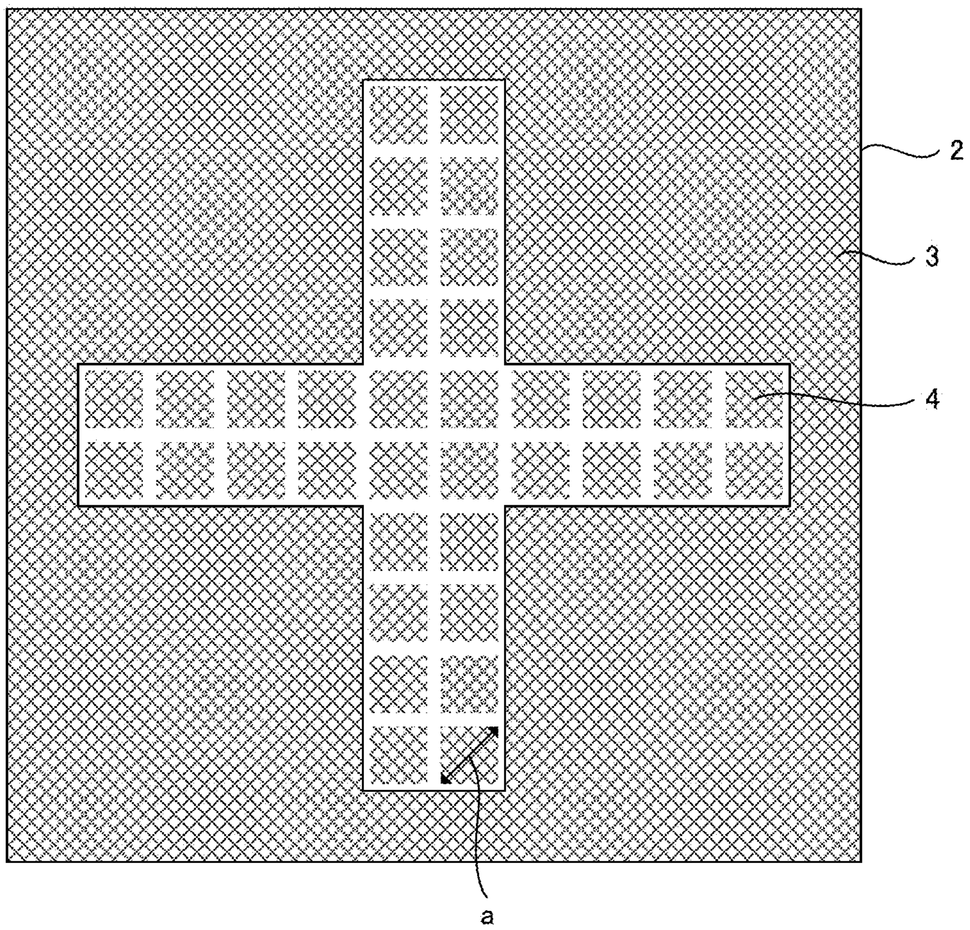

The shape of the resonant element is not particularly limited, and examples thereof may include any shape such as a pattern of patches or slots such as a ring shape, a cross shape, a square shape, a rectangular shape, a circular shape, an ellipse shape, and a bar shape; and a planar pattern such as a pattern divided into a plurality of adjacent regions. For example, FIGS. 1A and 1B are examples of cross-shaped patches, and FIGS. 3A and 3B are examples of cross-shaped slots. Incidentally, in the present disclosure, from the viewpoint of emphasizing the invisibility of the resonant element pattern, resonant element having a three-dimensional structure such as through-hole vias is not preferable.

Figure 4A:
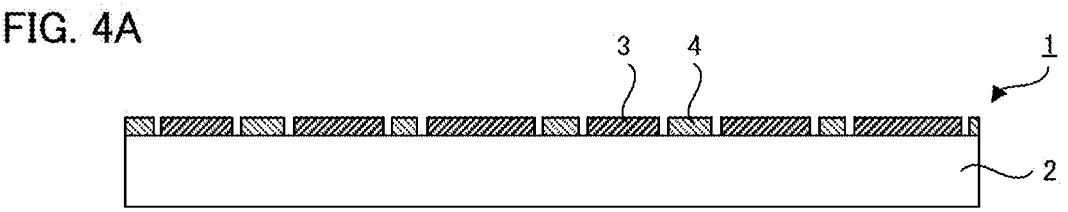
FIGS. 4A to 4D are schematic cross-sectional views illustrating an example of a transparent electromagnetic waves controlling member in the present disclosure.
Figure 4B:
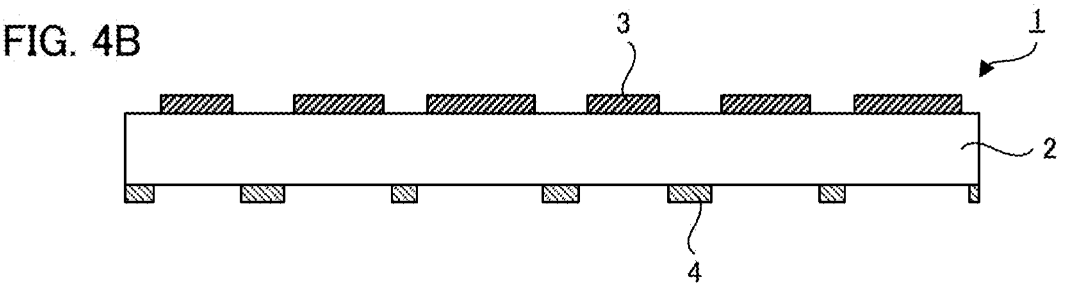
Figure 4C:
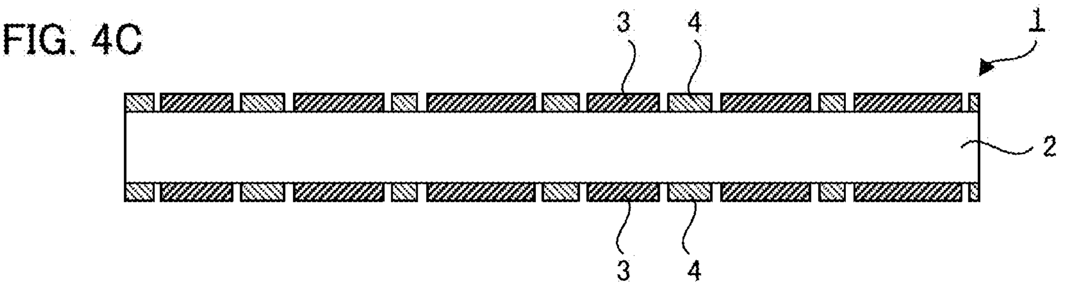
Figure 4D:
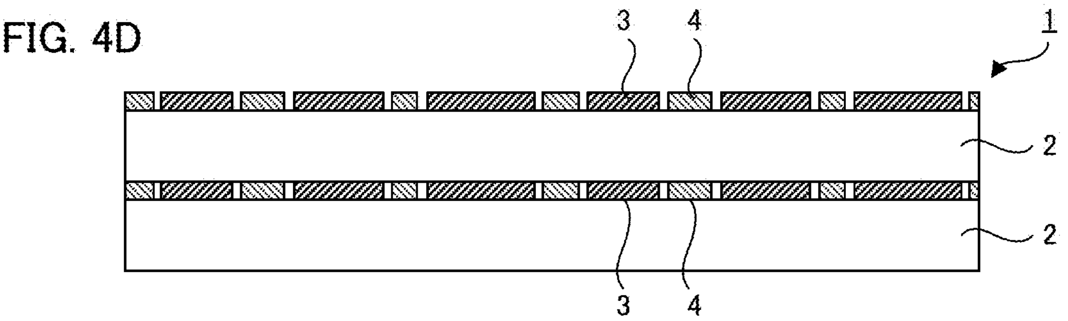

Also, the resonant element has only to be placed on at least one surface of the dielectric substrate. For example, the plurality of resonant elements 3 may be placed only on one surface of the dielectric substrate 2 as shown in FIGS. 4A and 4B, and the plurality of resonant elements 3 may be place on both surfaces of the dielectric substrate 2, as shown in FIG. 4C. When the plurality of resonant elements is placed only on one surface of the dielectric substrate, for example, the resonant element may have a single-layer structure. Also, when the plurality of resonant elements is place on both surfaces of the dielectric substrate, for example, the resonant element may have a multi-layer structure. Also, for example, as shown in FIG. 4D, the dielectric substrate 2, the plurality of resonant elements 3, dielectric substrate 2, and the plurality of resonant elements 3 may be stacked in this order, and also in this case, the resonant element may have a multi-layer structure.

The distribution of sizes of the resonant elements are appropriately selected depending on the shape of the resonant elements.

Examples of the resonant element transmitting visible light may include ones including a mesh structure constituted from a conductive mesh; or transparent conductive layers.

Each of the conductive mesh and transparent conductive layer is hereinafter described.

(1) Conductive Mesh

As for the conductive mesh, even when the conductive mesh itself is opaque, the conductive mesh may be made apparently transparent by reducing the line width. Since metal materials may be used as the conductive mesh as described later, the resistivity may be reduced compared to the transparent conductive layer.

The line width of the conductive mesh is appropriately set according to, for example, the material or thickness of the conductive mesh; the visible light transmittance of the region where the resonant elements are placed; and the visibility of the conductive mesh. Also, when the conductive mesh has a constant aperture ratio, the conductive mesh is preferably distributed as finely and uniformly as possible. This makes it difficult to visually recognize the pattern of the resonant elements. The lower limit of the size visible to the naked eye is usually said to be approximately 100 μm or 200 μm. Therefore, the line width of the conductive mesh is, for example, preferably 200 μm or less, and more preferably 100 μm or less. However, even when the pattern of the resonant elements may be recognized when viewed microscopically, it may be used without problems in practice if the pattern of the resonant elements appears uniformly when viewed macroscopically.

In particular, the line width of the conductive mesh is preferably 50 μm or less, more preferably 30 μm or less, and further preferably 10 μm or less. When the line width of the conductive mesh is too large, the conductive mesh may be easily recognized visually. Also, although the conductive mesh may be made more invisible by reducing the line width, when the line width is too small, the risk of disconnection is increased, and the production difficulty also increases. Therefore, the lower limit value of the line width of the conductive mesh is usually determined as appropriate, taking the production capability into consideration, and for example, it is approximately 1 μm or more. Incidentally, if the conductivity is insufficient due to the reduction of the line width of the conductive mesh, the conductivity may be ensured by reducing the pitch of the conductive mesh or increasing the thickness of the conductive mesh.

The mesh pattern of the conductive mesh is not particularly limited, and examples thereof may include square-lattice shape, rectangular-lattice shape, triangular-lattice shape, hexagonal-lattice shape, rhombus-lattice shape, and parallelogram-lattice shape.

Also, the aperture ratio of the conductive mesh is preferably, for example, 54% or more, more preferably 65% or more, and further preferably 76% or more. When the aperture ratio of the conductive mesh is in the above range, transparency may be ensured. Incidentally, in order to increase the aperture ratio of the conductive mesh, when the line width of the conductive mesh is maintained constant, the pitch of the conductive mesh is required to be broadened. However, the pitch of the conductive mesh influences the resolution when the size of the resonant element is finely adjusted. Therefore, the aperture ratio of the conductive mesh is, for example, preferably 98% or less, and more preferably 90% or less.

Incidentally, "aperture ratio of the conductive mesh" refers to the ratio (%) of the area of the aperture region (region where the aperture portion of the conductive mesh exists), per unit area of the region where the resonant elements are placed.

Figure 5A:
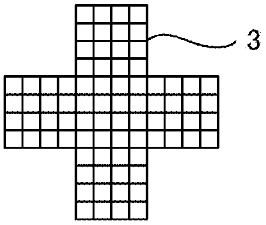
FIGS. 5A and 5B are schematic plan views illustrating an example of a resonant element in the transparent electromagnetic waves controlling member in the present disclosure.
Figure 5B:
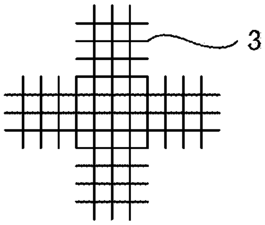

Also, when the resonant element including conductive mesh is a patch type, the outermost peripheral portion of the resonant element pattern including the conductive mesh is preferably fringed. For example, compared to the case where the outermost peripheral portion of the resonant element 3 pattern including the conductive mesh is not fringed as shown in FIG. 5B, when the outermost peripheral portion of the resonant element 3 pattern including the conductive mesh is fringed as shown in FIG. 5A for example, the disturbance of the resonance may be reduced, also, the resistivity may be reduced.

The pitch of the conductive mesh is not particularly limited as long as it satisfies the desired visible light transmittance and aperture ratio. Also, although the pitch of the conductive mesh may be regular, and may be irregular, it is preferably regular.

The material of the conductive mesh is not particularly limited as long as it is conductive material capable of forming a mesh pattern, and examples thereof may include metal materials such as metals such as copper, gold, silver, platinum, tin, and aluminum, and their alloys; and carbon materials. Also, the conductive mesh may include, for example, metal-based or carbon-based conductive particles and binder resins. As the binder resin, for example, thermosetting resins, ionizing radiation curable resins, and thermoplastic resins may be used. Further, the material of the transparent conductive layer described later may be used as the material of the conductive mesh.

Among them, the conductive mesh preferably includes metal materials, that is, it is preferably a metal mesh. As described above, the resistivity may be reduced with the metal mesh. Also, among the above, the metal material is preferably copper.

When the conductive mesh includes metal material, the surface of the conductive mesh may be subjected to a blackening treatment. This reduces the metallic luster and makes the conductive mesh less visible. Examples of the blackening treatment may include oxidation treatment, plating, chemical treatment, and anodization (formation of fine irregularities). Specifically, in the oxidation treatment, when the conductive mesh includes copper or copper alloy, the surface of the conductive mesh may be blackened by subjecting to the oxidation treatment the surface to form a copper oxide layer.

The thickness of the conductive mesh is appropriately set according to the material of the conductive mesh; the conductivity of the conductive mesh; the visible light transmittance of the region where the resonant elements are placed; and the visibility of the conductive mesh. For example, when the frequency of the electromagnetic waves is 28 GHZ, the thickness of the conductive mesh is required to be 0.4 μm or more due to the skin effect. In this case, when the thickness of the conductive mesh is less than 0.4 μm, the resistance value increases significantly. In this case, the thickness of the conductive mesh has only to be 0.4 μm or more, and it may be appropriately selected according to the processability of the material. Among them, the thickness of the conductive mesh is preferably the line width of the conductive mesh or less. By setting the thickness of the conductive mesh equivalent to the line width of the conductive mesh, or less than the line width of the conductive mesh, the resonant element patterns may be suppressed from being visible when the transparent electromagnetic waves controlling member is viewed at an angle.

Examples of the method for forming the conductive mesh may include a photolithography method, a printing method, a plating method, and a lift-off method. In the photolithography method, a conductive layer including the conductive material is etched, and the conductive layer may be, for example, a vapor deposition film formed by, for example, a vacuum deposition method or a sputtering method, and may be a metal foil. When the conductive layer is a metal foil, the conductive layer may be placed on the dielectric substrate via an adhesive layer. In this case, the adhesive layer needs to be a non-conductor. Also, in the printing method, for example, a conductive paste including the conductive particles and binder resin described above may be used. Examples of the printing method may include an inkjet method, and a screen printing method. Also, when the thickness of the conductive layer is thin, the lift-off method may also be used.

(2) Transparent Conductive Layer

As for the transparent conductive layer, the transparent conductive layer itself is transparent.

The material of the transparent conductive layer is not particularly limited as long as it is transparent conductive material, and examples thereof may include metal oxides such as indium tin oxide (ITO), indium zinc oxide (IZO), aluminum-doped zinc oxide (AZO), gallium-doped zinc oxide (GZO), and antimony-doped tin oxide (ATO). Also, the transparent conductive layer may include, for example, transparent conductive particles such as metal oxide based and binder resin; or it may include binder resin, and conductive nanoparticles such as metal nanomaterials and carbon nanoparticles, metal nanowires such as silver nanowires, or conductive nanomaterials such as carbon nanotubes. The binder resin has only to be transparent resin, and thermosetting resins, ionizing radiation curable resin, and thermoplastic resins, for example, may be used.

Figure 6:
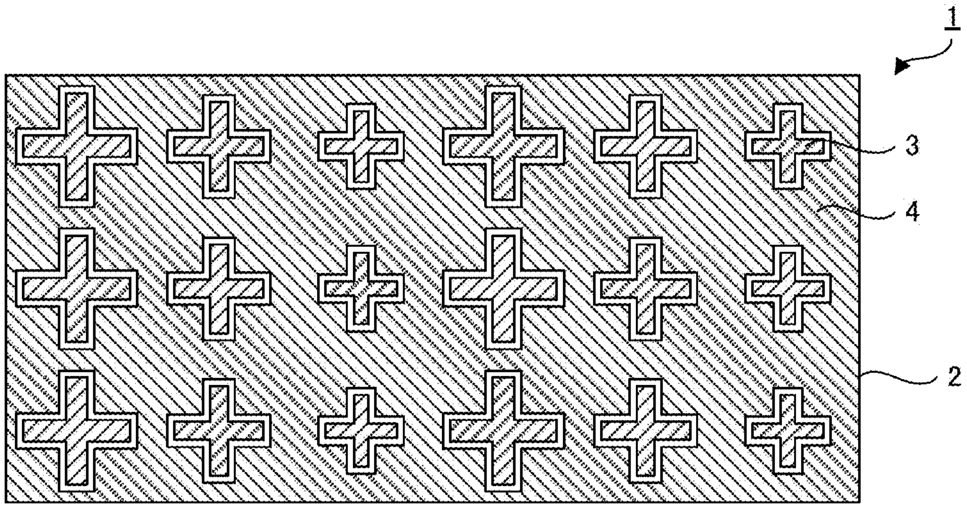
FIG. 6 is a schematic plan view illustrating an example of a transparent electromagnetic waves controlling member in the present disclosure.

Also, the transparent conductive layer may have, for example, a solid pattern. Incidentally, the solid pattern is a pattern including no aperture portion. For example, FIG. 6 is an example wherein the resonant element 3 has a cross-shaped solid pattern.

The thickness of the transparent conductive layer is appropriately set according to, for example, the material of the transparent conductive layer; the conductivity of the transparent conductive layer; the visible light transmittance of the region where the resonant elements are placed; and the visibility of the transparent conductive layer. The thickness of the transparent conductive layer is usually several hundred nm or less, since the transmittance may decrease, or the production cost may increase when the thickness of the transparent conductive layer is too thick.

Examples of the method for forming the transparent conductive layer may include a photolithography method, a deposition method with a deposition mask, a printing method, and a lift-off method. In the photolithography method, a transparent conductive layer including the transparent conductive material is etched, and examples of the transparent conductive layer may include a vapor deposition film formed by, for example, a vacuum deposition method and a sputtering method. Also, in the printing method, for example, a conductive paste including the transparent conductive particles and binder resin described above; or a conductive paste including the conductive nanomaterials and binder resin described above, may be used. Examples of the printing method may include an inkjet method, and a screen printing method.

3. Dummy Pattern

The dummy pattern in the present disclosure is a pattern placed on at least one surface of the dielectric substrate, placed in a region other than a region where the plurality of resonant elements is placed, and transmitting visible light. In other words, the dummy pattern is a pattern placed in a region where the plurality of resonant elements does not exist, in order to make the pattern of the resonant elements invisible.

The dummy pattern may be a non-resonant pattern that does not resonate with electromagnetic waves in a particular frequency band.

The dummy pattern has only to be placed on at least one surface of the dielectric substrate. For example, when the resonant elements are placed only on one surface of the dielectric substrate, the dummy patterns 4 may be placed on the resonant elements 3 side surface of the dielectric substrate 2 as shown in FIG. 4A; or the dummy patterns 4 may be placed on the dielectric substrate 2, on the surface opposite side to the resonant elements 3 as shown in FIG. 4B. In this case, among the above, the dummy patterns are preferably placed on the resonant element side surface of the dielectric substrate since it looks better. Also, for example, when the resonant elements are placed on both surfaces of the dielectric substrate, the dummy patterns 4 may be placed only on one surface of the dielectric substrate although not shown in the figures, and may be place on both surfaces of the dielectric substrate 2, as shown in FIG. 4C. In this case, among the above, the dummy patterns are preferably placed on both surfaces of the dielectric substrate since it looks better.

The dummy pattern has only to be placed in the region other than the region where the plurality of resonant elements is placed, and is preferably placed in almost the entire region of the region other than the region where the plurality of resonant elements is placed, to the extent that it does not conduct with the resonant element. Thereby, the visibility of the resonant element pattern may further be decreased.

The dummy pattern is not particularly limited as long as it is a pattern transmitting visible light and not resonating with electromagnetic waves in a particular frequency band, and preferable examples may include those with a size that does not resonate with the electromagnetic waves; and those are non-conductive.

The first aspect wherein the size of the dummy pattern is a size that does not resonate with the electromagnetic waves in a particular frequency band; and the second aspect wherein the dummy pattern is non-conductive are hereinafter explained separately.

(1) First Aspect of Dummy Pattern

In the dummy pattern of the present aspect, the size of the dummy pattern is a size that does not resonate with the electromagnetic waves in a particular frequency band. As described later, in the present aspect, the conductive materials may be used for the dummy pattern so that the resonant element and dummy pattern may be formed at the same time.

The size of the dummy pattern in the present aspect is a size that does not resonate with electromagnetic waves in a particular frequency band, and specifically, it is preferably sufficiently smaller than the wavelength of electromagnetic waves in a particular frequency band. More specifically, the size of the dummy pattern is preferably 0.1 times or less, more preferably 0.05 times or less, and further preferably 0.01 times or less of the wavelength of the electromagnetic waves in a particular frequency band. For example, when the frequency of the electromagnetic waves is 28 GHz, the wavelength $\lambda$ of the electromagnetic waves is 10.4 mm, the size of the dummy pattern size in this case is preferably 1 mm or less, more preferably 0.5 mm or less, and further preferably 0.1 mm or less. The smaller the size of the dummy pattern, the smaller the electromagnetic wave reflection intensity S11 in the region where the dummy patterns are placed becomes, so that the smaller the influence on the electromagnetic waves controlling function constituted from the resonant elements becomes. Incidentally, in the design of the electromagnetic waves controlling function, when the lower limit of the size of the plurality of resonant elements is approximately 0.1 times of the wavelength of the electromagnetic waves, in order to decrease the influence on the electromagnetic waves controlling function, the size of the dummy pattern is preferably set to 0.05 times or less of the wavelength of the electromagnetic waves. Meanwhile, the size of the dummy pattern is preferably, for example, 1 μm or more, and more preferably 10 μm or more. When the size of the dummy pattern is too small, formation thereof may be difficult.

Figure 7A:
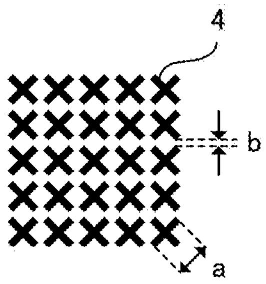
FIGS. 7A to 7E are schematic plan views illustrating an example of dummy patterns in the transparent electromagnetic waves controlling member in the present disclosure.
Figure 7B:
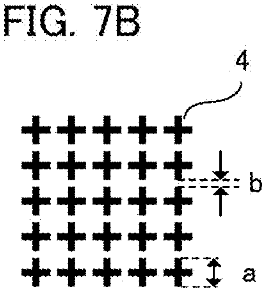
Figure 7C:
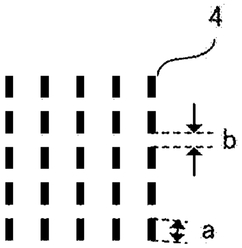
Figure 7D:
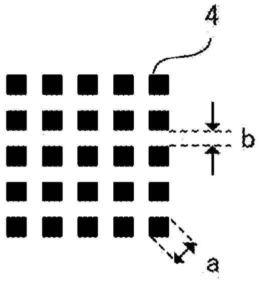
Figure 7E:
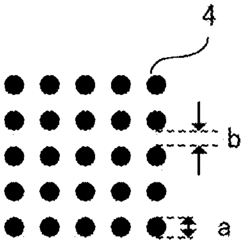

Incidentally, the size of the dummy pattern is the longest length in the dummy pattern. For example, when the shape of the dummy pattern in a plan view is rectangular, the size of the dummy pattern is the length of the diagonal line. Also, for example, when the shape of the dummy pattern in a plan view is circular, the size of the dummy pattern is the diameter, and when the shape of the dummy pattern in a plan view is elliptical, the size of the dummy pattern refers to the long diameter. Also, for example, when the shape of the dummy pattern in a plan view is a cross, the size of the dummy pattern is the length of the longer line of the two lines. For example, FIGS. 1B, 3B, 7C, and 7D are examples wherein the shape of the dummy pattern 4 in a plan view is a rectangular plane, and the size "a" of the dummy pattern 4 is the length of the diagonal line. Also, FIGS. 7A, and 7B are examples wherein the shape of the dummy pattern 4 in a plan view is a cross, and the size "a" of the dummy pattern is the length of the longer line of the two lines. Also, for example, FIG. 7E is an example wherein the shape of the dummy pattern 4 in a plan view is circular, and the size "a" of the dummy pattern 4 is the diameter.

The size of the plurality of dummy patterns may be, for example, the same or different.

Also, when the resonant element has a mesh structure constituted from a conductive mesh, the aperture ratio of the region where the dummy patterns in the present aspect are placed and the aperture ratio of the conductive mesh constituting the resonant elements are preferably approximately equal. Thereby, the visibility of the resonant element patterns may further be decreased.

Incidentally, the aperture ratio of the region where the dummy patterns are placed and the aperture ratio of the conductive mesh constituting the resonant elements being approximately equal means that the difference between the aperture ratio of the region where the dummy patterns are placed and the aperture ratio of the conductive mesh constituting the resonant elements is within 2%. The difference of the aperture ratio is preferably, for example, within 2%, more preferably within 1%, and further preferably within 0.5%.

The aperture ratio of the region where the dummy patterns are placed is described later.

Also, in the present aspect, the distance between adjacent dummy patterns is preferably set to satisfy the difference of the aperture ratio described above. For example, when the aperture ratio of the conductive mesh constituting the resonant element is 80%, and when the dummy pattern is a dot pattern, the shape of the dot is a square shape of 50 μm×50 μm (area of 2500 $\mu m^2$), and the dot arrangement is a square grid, when the aperture ratio of the region where the dummy patterns are placed is 80%, the pitch of the dot is approximately 112 μm. In this case, the distance between adjacent dummy patterns is approximately 62 μm. Incidentally, when the distance between adjacent dummy patterns is too small, it may resonate with electromagnetic waves in a particular frequency band. Also, when the distance between adjacent dummy patterns is too large, the dummy pattern may be easily recognized visually.

Incidentally, the distance between adjacent dummy patterns is the distance from the end portion of one dummy pattern to the end portion of the other dummy pattern, and in FIG. 1B and FIGS. 7A to 7E for example, it is indicated with "b".

In the plurality of dummy patterns, the distance between adjacent dummy patterns may be regular, and may be irregular.

In the present aspect, the plurality of dummy patterns with a predetermined size is placed. The plurality of dummy patterns is preferably distributed uniformly. This makes it difficult to visually recognize the dummy pattern.

Examples of the dummy pattern transmitting visible light may include, a first dummy pattern, although the dummy pattern itself is opaque, it is apparently transparent by reducing the line width or the size; and a second dummy pattern wherein the dummy pattern itself is transparent.

The first dummy pattern and the second dummy pattern are hereinafter explained separately.

(a) First Dummy Pattern

Even if the dummy pattern itself is opaque, the first dummy pattern is apparently transparent by reducing the line width or the size.

The pattern shape of the first dummy pattern is not particularly limited as long as it is a pattern shape capable of setting the size of the dummy pattern to a size that does not resonate with the electromagnetic waves in a particular frequency band, and also a pattern shape capable of making the dummy pattern apparent transparent by reducing the line width or the size, although the dummy pattern itself is opaque; and examples thereof may include mesh patterns, and dot patterns. In the case of the mesh pattern, the transparency may be ensured effectively by making the first dummy pattern a mesh pattern, even if the size of the first dummy pattern is a visible size. Also, in the case of the dot pattern, the transparency may be ensured by reducing the size of the first dummy pattern (the size of the dots) and ensuring the distance between the first dummy patterns (the distance between the dots).

The mesh pattern is not particularly limited, and examples thereof may include square-lattice shape, rectangular-lattice shape, triangular-lattice shape, hexagonal-lattice shape, rhombus-lattice shape, and parallelogram-lattice shape.

In the dot pattern, the shape of the dot is not particularly limited, and examples thereof may include a cross-shape, a Y-shape and a rectangular shape. Also, the arrangement of the dots is not particularly limited, and examples thereof may include square-lattice arrangement, rectangular-lattice arrangement, triangular-lattice arrangement, hexagonal-lattice arrangement, rhombus-lattice arrangement, and parallelogram-lattice arrangement. FIGS. 7A and 7B are examples of the cross-shaped dot patterns, FIGS. 7C and 7D are examples of the rectangular shaped dot patterns, and FIG. 7E is an example of the circular shaped dot patterns.

Also, the pattern shape of the first dummy pattern may be the same as the shape of the resonant element pattern, and may be different from the shape of the resonant element pattern.

The aperture ratio of the region where the first dummy patterns are placed is not particularly limited as long as it satisfies the difference of the aperture ratio described above, and is preferably, for example, 54% or more, more preferably 65% or more, and further preferably 76% or more. When the aperture ratio of the region where the first dummy patterns are placed is in the above range, the transparency of the region where the first dummy patterns are placed may be ensured. Also, the aperture ratio of the region where the first dummy patterns are placed has only to be, for example, 99.9% or less.

Incidentally, "aperture ratio of the region where the first dummy patterns are placed" refers to the ratio (%) of the area of the aperture region (region where no material constituting the first dummy pattern exists), per unit area of the region where the first dummy patterns are placed.

When the first dummy pattern is a mesh pattern, the line width of the mesh pattern is appropriately set according to, for example, the material or the thickness of the dummy pattern, the visible light transmittance of the region where the dummy patterns are placed, and the visibility of the dummy pattern. The line width of the mesh pattern may be similar to the line width of the conductive mesh constituting the resonant elements.

When the first dummy pattern is a dot pattern, and when the aperture ratio of the region where the dummy patterns are placed is constant, the dot pattern is preferably distributed as finely and uniformly as possible. This makes it difficult to visually recognize the dot pattern. As described above the lower limit value of the size visible to the naked eye is usually said to be approximately 100 μm or 200 μm. Therefore, the size of the dot pattern is preferably, for example, 200 μm or less, and more preferably 100 μm or less. However, even when the dot pattern may be recognized when viewed microscopically, it may be used without problems in practice if the dot pattern appears uniformly when viewed macroscopically.

Also, when the first dummy pattern is a dot pattern, the pitch of the dot patterns is preferably set to satisfy the difference of the aperture ratio described above. The pitch of the dot patterns may be regular, and may be irregular.

As the material of the first dummy pattern, for example, conductive materials may be used. The conductive material used for the first dummy pattern is not particularly limited as long as it is conductive material capable of making the dummy pattern itself opaque, and examples thereof may include metal materials such as metals such as copper, gold, silver, platinum, tin, aluminum and nickel, and their alloys; and carbon materials. Also, the first dummy pattern may include, for example, metal-based or carbon-based conductive particles and binder resins. As the binder resin, for example, thermosetting resins, ionizing radiation curable resin, and thermoplastic resins may be used.

Also, the material of the first dummy pattern may be the same as the material of the resonant element, and may be different from the material of the resonant element. When the resonant element and the dummy pattern include the same material, the visible light transmittance, of region where the resonant elements are placed and the region where the dummy patterns are placed, may be easily matched. Also, the resonant element and dummy pattern may be formed at the same time.

When the first dummy pattern includes metal material, the surface of the first dummy pattern may be subjected to a blackening treatment in order to suppress the metallic luster. The blackening treatment may be similar to the blackening treatment of the conductive mesh constituting the resonant element.

The thickness of the first dummy pattern is appropriately set according to, for example, the material of the dummy pattern, the visible light transmittance of the region where the dummy patterns are placed, and the visibility of the dummy pattern. When the frequency of the electromagnetic waves is 28 GHz, due to the skin effect, the thickness of the first dummy pattern is necessary to be 0.4 μm or more. In this case, when the thickness of the first dummy pattern is less than 0.4 μm, the resistance value increases significantly. In this case, the thickness of the first dummy pattern has only to be 0.4 μm or more, and it may be appropriately selected according to the processability of the material. Among them, the thickness of the first dummy pattern is preferably equal to or less than the line width of the first dummy pattern. The dummy pattern may be suppressed from being visible when the transparent electromagnetic waves controlling member is viewed at an angle by setting the thickness of the first dummy pattern equivalent to the line width of the first dummy pattern, or less than the line width of the first dummy pattern. Also, when the resonant element and the dummy pattern include the same material, the thickness of the resonant element and the thickness of the dummy pattern are preferable the same, from the viewpoint of designing and processing.

Examples of the method for forming the first dummy pattern may include a photolithography method, a printing method, a plating method, and a lift-off method. In the photolithography method, a conductive layer including the conductive material is etched, and the conductive layer may be, for example, a vapor deposition layer formed by, for example, a vacuum deposition method and a sputtering method, and may be a metal foil. When the conductive layer is a metal foil, the conductive layer may be placed on the dielectric substrate via an adhesive layer. In this case, the adhesive layer needs to be a non-conductor. Also, in the printing method, for example, a conductive paste including the conductive particles and binder resin described above may be used. Examples of the printing method may include an inkjet method, and a screen printing method. Also, when the thickness of the conductive layer is thin, the lift-off method may also be used.

(b) Second Dummy Pattern

As for the second dummy pattern, the dummy pattern itself is transparent.

The pattern shape in a plan view of the second dummy pattern is not particularly limited as long as it is a pattern shape capable of setting the size of the dummy pattern to a size that does not resonate with the electromagnetic waves in a particular frequency band; and examples thereof may include mesh patterns, and dot patterns.

The mesh pattern is not particularly limited, and examples thereof may include square-lattice shape, rectangular-lattice shape, triangular-lattice shape, hexagonal-lattice shape, rhombus-lattice shape, and parallelogram-lattice shape.

In the dot pattern, the shape of the dot is not particularly limited, and examples thereof may include rectangular shape, polygonal shape, circular shape, elliptical shape, cross-shape, and Y-shape. Also, the arrangement of the dots is not particularly limited, and examples thereof may include square-lattice arrangement, rectangular-lattice arrangement, triangular-lattice arrangement, hexagonal-lattice arrangement, rhombus-lattice arrangement, and parallelogram-lattice arrangement. FIGS. 7A and 7B are examples of the cross-shaped dot pattern, FIGS. 7C and 7D are examples of the rectangular shaped dot pattern, and FIG. 7E is an example of the circular shaped dot pattern.

The aperture ratio of the region where the second dummy patterns are placed is not particularly limited as long as it satisfies the difference of the aperture ratio described above, and is preferably, for example, 54% or more, more preferably 65% or more, and further preferably 76% or more. When the aperture ratio of the region where the second dummy patterns are placed is in the above range, it is possible to make the second dummy pattern invisible, as well as the reflection/transmission properties of the electromagnetic waves in the region where the second dummy patterns are placed may be ensured. Also, the aperture ratio of the region where the second dummy patterns are placed has only to be, for example, 99.9% or less.

Incidentally, "aperture ratio of the region where the second dummy patterns are placed" refers to the ratio (%) of the area of the aperture region (region where no material constituting the second dummy pattern exists), per unit area of the region where the second dummy patterns are placed.

As the material of the second dummy pattern, for example, a transparent conductive material may be used. The transparent conductive material used in the second dummy pattern is not particularly limited, and examples thereof may include metal oxides such as indium tin oxide (ITO), indium zinc oxide (IZO), aluminum-doped zinc oxide (AZO), gallium-doped zinc oxide (GZO), and antimony-doped tin oxide (ATO). Also, the second dummy pattern may include, for example, transparent conductive particles such as metal oxide based and binder resin; or it may include binder resin, and conductive nanoparticles such as metal nanomaterials and carbon nanoparticles, metal nanowires such as silver nanowires, or conductive nanomaterials such as carbon nanotubes. The binder resin has only to be transparent resin, and thermosetting resins, ionizing radiation curable resin, and thermoplastic resins, for example, may be used.

Also, the material of the second dummy pattern may be the same as the material of the resonant element, and may be different from the material of the resonant element. When the resonant element and the dummy pattern include the same material, the visible light transmittance, of region where the resonant elements are placed and the region where the dummy patterns are placed, may be easily aligned. Also, the resonant element and dummy pattern may be formed at the same time.

The thickness of the second dummy pattern is appropriately set according to, for example, the material of the dummy pattern, the visible light transmittance of the region where the dummy patterns are placed, and the visibility of the dummy pattern. The thickness of the second dummy pattern is usually several hundred nm or less, since the transmittance may decrease, or the production cost may increase when the thickness of the second dummy pattern is too thick.

Examples of the method for forming the second dummy pattern may include a photolithography method, a deposition method with a deposition mask, a printing method, and a lift-off method. In the photolithography method, a transparent conductive layer including the transparent conductive material is etched, and examples of the transparent conductive layer may include a vapor deposition film formed by, for example, a vacuum deposition method and a sputtering method. Also, in the printing method, for example, a conductive paste including the transparent conductive particles and binder resin described above; or a conductive paste including the conductive nanomaterials and binder resin described above, may be used. Examples of the printing method may include an inkjet method, and a screen printing method.

(2) Second Aspect of Dummy Pattern

The dummy pattern in the present aspect has non-conductivity. In the present aspect, since the dummy pattern has non-conductivity, it is possible to ensure that it does not resonate with electromagnetic waves in a particular frequency band.

In the present aspect, the dummy pattern itself may be transparent, and may be opaque. When the dummy pattern itself is opaque, the dummy pattern may be made apparently transparent by reducing the line width or the size.

As the material of the dummy pattern in the present aspect non-conductive material may be used. As described above, the non-conductive material may be transparent, and may be opaque.

The transparent non-conductive material is not particularly limited, and examples thereof may include transparent resins; and transparent inorganic materials such as inorganic oxides, and inorganic nitrides. As the transparent resin, for example, thermosetting resins, ionizing radiation curable resins, and thermoplastic resins may be used.

The opaque non-conductive material is not particularly limited, and, for example, it may include colorants and binder resins. The colorant is not particularly limited as long as it has non-conductive properties, and for example, it may be organic based, and it may be inorganic based. In particular, when the resonant element includes metal material or carbon material, for example, the colorant is preferably a colorant capable of obtaining a dummy pattern with a color taste of the same type as the color taste of the resonant element. Thereby, the visible light transmittance, of region where the resonant elements are placed and the region where the dummy pattern is placed, may be easily aligned. The binder resin has only to be transparent resin, and thermosetting resins, ionizing radiation curable resins, and thermoplastic resins, for example, may be used.

In particular, as described above, the material of the dummy pattern preferably has a color taste similar to the conductive material constituting the resonant element.

The pattern shape in a plan view of the dummy pattern in the present aspect is not particularly limited; and examples thereof may include mesh patterns, dot patterns, line patterns, and solid patterns. For example, FIG. 2 is an example wherein the dummy pattern 4 is a mesh pattern, and FIG. 6 is an example wherein the dummy pattern 4 is a solid pattern.

The mesh pattern is not particularly limited, and examples thereof may include square-lattice shape, rectangular-lattice shape, triangular-lattice shape, hexagonal-lattice shape, rhombus-lattice shape, and parallelogram-lattice shape.

In the dot pattern, the shape of the dot is not particularly limited, and examples thereof may include rectangular shape, polygonal shape, circular shape, elliptical shape, cross-shape, and Y-shape. Also, the arrangement of the dots is not particularly limited, and examples thereof may include square-lattice arrangement, rectangular-lattice arrangement, triangular-lattice arrangement, hexagonal-lattice arrangement, rhombus arrangement, and parallelogram-lattice arrangement.

When the resonant element has a mesh structure constituted with a conductive mesh, and when the dummy pattern of the present aspect is, for example, a mesh pattern, dot pattern, or a line pattern, the aperture ratio of the conductive mesh constituting the resonant element and the aperture ratio of the region where the dummy pattern is placed are preferably approximately equal. Thereby, the visibility of the resonant element pattern may further be decreased.

Incidentally, the aperture ratio of the conductive mesh constituting the resonant element, and the aperture ratio of the region where the dummy pattern is placed being approximately equal means that the difference between the aperture ratio of the conductive mesh constituting the resonant element, and the aperture ratio of the region where the dummy pattern is placed is within 2%. The difference of the aperture ratio is preferably, for example, within 2%, more preferably within 1%, and further preferably within 0.5%.

Also, the aperture ratio of the region where the dummy pattern is placed is not particularly limited as long as it satisfies the difference of the aperture ratio described above, and is preferably, for example, 54% or more, more preferably 65% or more, and further preferably 76% or more. Also, the aperture ratio of the region where the dummy pattern is placed has only to be, for example, 99.9% or less.

Incidentally, "aperture ratio of the region where the dummy pattern is placed" refers to the ratio (%) of the area of the aperture region (region where no material constituting the dummy pattern exists), per unit area of the region where the dummy pattern is placed.

Also, when the dummy pattern is opaque, the line width of the mesh pattern and the size of the dot pattern may be similar to the first dummy pattern in the first aspect of the dummy pattern described above.

The thickness of the dummy pattern in the present aspect is appropriately set according to, for example, the material of the dummy pattern, the visible light transmittance of the region where the dummy pattern is placed, and the visibility of the dummy pattern. Among them, the thickness of the dummy pattern is preferably the same as the thickness of the resonant element. The dummy pattern may be suppressed from being visible when the transparent electromagnetic waves controlling member is viewed at an angle.

Examples of the method for forming a dummy pattern in the present aspect may include a photolithography method and a printing method.

4. Dielectric Substrate

The dielectric substrate in the present disclosure is a member transmitting visible light, and supporting the resonant element and dummy pattern described above.

The dielectric substrate transmits visible light. The visible light transmittance of the dielectric substrate is preferably, for example, 50% or more, more preferably 80% or more, and further preferably 92% or more.

For the dielectric substrate, the dielectric dissipation factor and the dielectric constant, with respect to the electromagnetic waves in a particular frequency band, are appropriately selected.

The dielectric substrate is not particularly limited as long as it satisfies the visible light transmittance described above, and general dielectric substrates used in reflect arrays and transmit arrays may be used. Specifically, for example, resin substrates or glass substrates may be used. Also, when the transparent electromagnetic waves controlling member in the present disclosure is used by being adhered to, for example, a glass substrate or a glass window, the dielectric substrate preferably has a scattering prevention function, and, for example, a resin substrate commonly used as a scattering prevention film such as polyester films such as PET films are preferably used.

Also, the thickness of the dielectric substrate is not particularly limited, and may be appropriately selected.

5. Other Configurations

The transparent electromagnetic waves controlling member in the present disclosure may include other configurations other than the dielectric substrate, the resonant element, and the dummy pattern described above, as required.

(1) Grounding Layer

When the transparent electromagnetic waves controlling member in the present disclosure is a reflect array, a grounding layer, transmitting visible light, may be included on the dielectric substrate, on a surface opposite side to the resonant element. The grounding layer may block interference with objects present on the backside of the transparent electromagnetic waves controlling member and suppress the occurrence of noise.

The grounding layer is not particularly limited as long as it transmits visible light, and examples thereof may include a conductive mesh and a transparent conductive layer. As the conductive mesh, for example, a metal mesh and a carbon mesh may be used. Also, examples of the material of the transparent conductive layer may include metal oxides such as ITO; transparent conductive particles such as metal oxide based and binder resin; and conductive nanomaterials and binder resin.

When the resonant element is a conductive mesh, or when the dummy pattern is a mesh pattern, and when the grounding layer is a conductive mesh, a means to suppress the generation of moire is preferably provided. Examples of the means to suppress the generation of moire may include a method wherein the pitch or the bias angle of the conductive mesh constituting the grounding layer is made different from that of the conductive mesh constituting the resonant element or the mesh pattern constituting the dummy pattern; and a method wherein the conductive mesh constituting the grounding layer is made into a random lattice.

The grounding layer has only to be placed on the dielectric substrate, on the surface opposite side to the resonant element. For example, when the resonant element is placed only on one surface of the dielectric substrate, the grounding layer may be placed directly on the dielectric substrate, on the surface opposite side to the resonant element; or the grounding layer may be placed on another dielectric substrate, and adhered to the dielectric substrate, on the surface opposite side to the resonant element. Also, for example, when the resonant element is placed on both surfaces of the dielectric substrate, the grounding layer may be placed on another dielectric substrate, and adhered to one resonant element side surface of the dielectric substrate.

(2) Planarizing Layer

In the present disclosure, a planarizing layer transmitting visible light may be placed on at least one surface of the dielectric substrate so as to cover the resonant element or the dummy pattern. The planarizing layer may flatten the unevenness of the resonant element or the dummy pattern, and may suppress the increase of the haze due to the unevenness.

The material of the planarizing layer is not particularly limited as long as it transmits visible light, and examples thereof may include ionizing radiation curable resins, adhesives, and pressure-sensitive adhesives.

Also, the planarizing layer may include, for example, an additive such as an ultraviolet absorber, a light stabilizer, an antioxidant. Thereby, the durability of the resonant element may be improved.

The planarizing layer is placed on at least one surface of the dielectric substrate so as to cover the resonant element or the dummy pattern. For example, when the resonant element and dummy pattern are placed on one surface of the dielectric substrate, a planarizing layer is placed on the resonant element and the dummy pattern side surface of the dielectric substrate. Also, for example, when the resonant element is placed on one surface of the dielectric substrate and the dummy pattern is placed on the other surface of the dielectric substrate, the planarizing layer is placed on both of the resonant element side surface and the dummy pattern side surface of the dielectric substrate. Also, for example, when the resonant element and dummy pattern are placed on both surfaces of the dielectric substrate, the planarizing layer is placed on both surfaces of the dielectric substrate.

(3) Protective Member

In the present disclosure, a protective member transmitting visible light may be placed on at least one surface of the dielectric substrate so as to cover the resonant element. The resonant element may be protected by the protective member. Further, design may also be imparted by the protective member.

The material of the protective member is not particularly limited as long as it transmits visible light, and examples thereof may include ionizing radiation curable resins.

Also, the protective member may include, for example, an additive such as an ultraviolet absorber, a light stabilizer, an antioxidant. Thereby, the durability of the resonant element may be improved.

6. Transparent Electromagnetic Waves Controlling Member

The transparent electromagnetic waves controlling member in the present disclosure is a member transmitting visible light and controlling a reflection direction or a transmission direction of electromagnetic waves in a particular frequency band.

The transparent electromagnetic waves controlling member in the present disclosure may be a member transmitting visible light and controlling a reflection direction of electromagnetic waves in a particular frequency band, a so-called reflect array. In the reflect array, it is able to reflect electromagnetic waves in a particular frequency band to a direction different from a regular reflection direction.

Also, the transparent electromagnetic waves controlling member in the present disclosure may be a member transmitting visible light and controlling a transmission direction of electromagnetic waves in a particular frequency band, a so-called transmit array. In the transmit array, it is able to control the wave front when electromagnetic waves in a particular frequency band are transmitted.

The transparent electromagnetic waves controlling member in the present disclosure controls a reflection direction or a transmission direction of electromagnetic waves in a particular frequency band. The frequency band of the electromagnetic waves is, for example, preferably 24 GHz or more, and more preferably 24 GHz or more and 300 GHz or less. Also, the frequency band of the electromagnetic waves preferably corresponds to, for example, 410 MHZ or more and 7125 MHz or less or 24250 MHz or more and 52600 MHz or less, in this case, more preferably corresponds to 24250 MHz or more and 52600 MHz or less. When the frequency band of the electromagnetic waves is in the above range, the transparent electromagnetic waves controlling member in the present disclosure may be utilized for the fifth generation mobile communication system, so-called 5G. Incidentally, even when the transparent electromagnetic waves controlling member is designed for a frequency band higher than the above range, it is possible to make the resonant element pattern invisible by employing the configuration of the present disclosure, and changing the material and shape of each member constituting the transparent electromagnetic waves controlling member.

The transparent electromagnetic waves controlling member in the present disclosure may be used, for example, as a transparent electromagnetic waves controlling member for communication, and particularly, it is suitable as a transparent electromagnetic waves controlling member for mobile communication.

For example, the transparent electromagnetic waves controlling member in the present disclosure may be used by being adhered to a transparent substrate such as glass substrates or resin substrates, or by being directly adhered to, for example, windows or walls.

B. Transparent Substrate with Transparent Electromagnetic Waves Controlling Member The transparent substrate with a transparent electromagnetic waves controlling member in the present disclosure comprises: a transparent substrate; and the transparent electromagnetic waves controlling member described above placed on one surface of the transparent substrate.

Each constitution of the transparent substrate with a transparent electromagnetic waves controlling member in the present disclosure is hereinafter described.

1. Transparent Electromagnetic Waves Controlling Member

The transparent electromagnetic waves controlling member in the present disclosure is described in detail in the section “A. Transparent electromagnetic waves controlling member” above, so the explanation here is omitted.

Examples of the method for placing the transparent electromagnetic waves controlling member on one surface of the transparent substrate may include a method via an adhesive layer. For the adhesive layer, for example, an adhesive agent or a pressure-sensitive adhesive agent, and may be appropriately selected and used from known adhesive agents and pressure-sensitive adhesive agents. Also, an optically clear adhesive (OCA) sheet may be used.

2. Transparent Substrate

The transparent substrate in the present disclosure is a member supporting the transparent electromagnetic waves controlling member.

The transparent substrate transmits visible light. The visible light transmittance of the transparent substrate is preferably, for example, 50% or more, more preferably 80% or more, and further preferably 92% or more.

The transparent substrate is not particularly limited as long as it is a transparent substrate transmitting visible light; and examples thereof may include a glass substrate, and a resin substrate.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained specifically with reference to Example.

Figure 8:
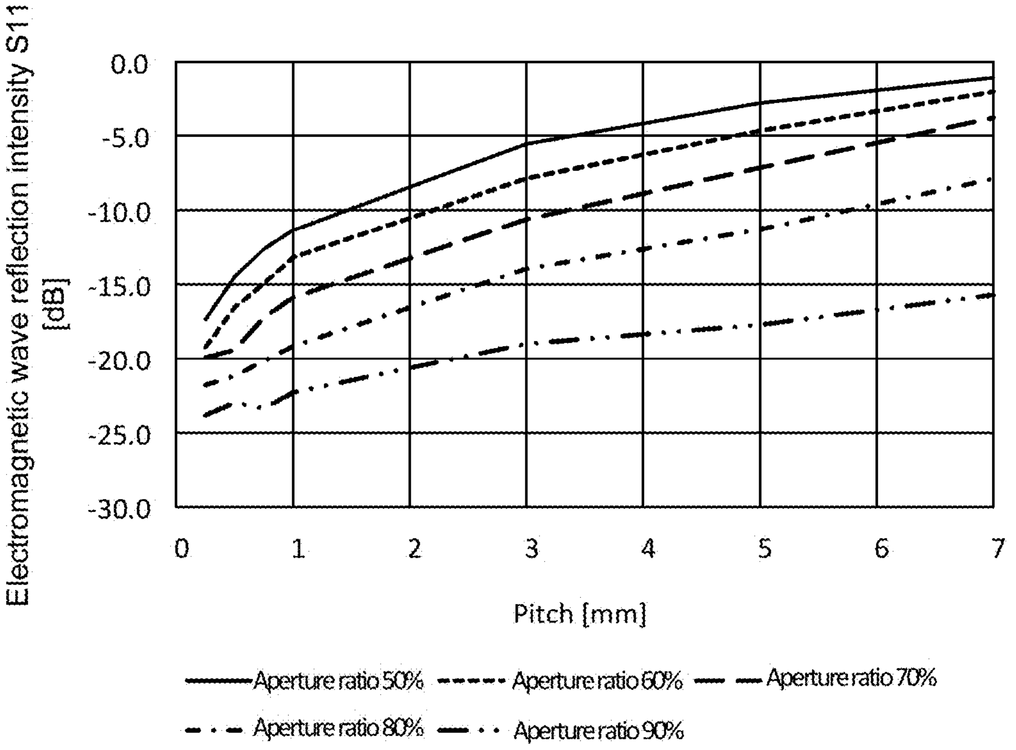
FIG. 8 is a graph showing the simulation results of the reflection properties of the transparent electromagnetic waves controlling member in the present disclosure.

Simulation of reflection properties of the transparent electromagnetic waves controlling member was carried out. In the simulation, when the resonant element that corresponds to the electromagnetic waves of 28 GHz has a ring shape and includes a mesh structure, the smaller the electromagnetic waves reflection intensity S11 in the region where the dummy patterns are placed, the less influence on the reflection properties of the resonant element. Also, the dummy pattern was a dot pattern, the shape of the dot was a square shape, and the dot arrangement was a square grid. Also, FIG. 8 shows the simulation results of the electromagnetic waves reflection intensity of the region where the dummy patterns were placed, when the aperture ratio of the region where the dummy patterns were placed was set to 50%, 60%, 70%, 80% and 90% respectively, the pitch of the dot patterns was changed from 0 mm to 7 mm, and the size of the dots were changed so as to ensure the set aperture ratio.

When using a light transparent ring-shaped resonant element, and making the resonant element less likely to be noticed by placing dot patterns (dummy pattern), having an aperture ratio coincident with the mesh constituting the ring-shaped resonant element, around the resonant element, when the aperture ratio to be set is in the range of 50% to 90%, the electromagnetic wave reflection intensity S11 in the region where the dummy patterns are placed will be −10 [dB] or less, by setting the pitch of the dot patterns (dummy pattern) to 1 mm or less. Therefore, it is possible to make the resonant element less noticeable without significantly affecting the reflection from the ring-shaped resonant element. Also, when the pitch of the dot patterns (dummy pattern) is 0.5 mm or less, the electromagnetic waves reflection intensity S11 will be −15 [dB] or less. Also, when the aperture ratio is 70% or more and the pitch of the dot patterns (dummy pattern) is 0.25 mm or less, the electromagnetic waves reflection intensity S11 will be −20 [dB] or less. Therefore, the influence on the reflection from the resonant element may further be reduced.

The present disclosure provides the following inventions.

[1]

A transparent electromagnetic waves controlling member transmitting visible light and controlling a reflection direction or a transmission direction of electromagnetic waves in a particular frequency band, the transparent electromagnetic waves controlling member comprising:

a dielectric substrate transmitting visible light;

a plurality of resonant elements placed on at least one surface of the dielectric substrate, transmitting visible light and resonating with the electromagnetic waves; and a dummy pattern placed on at least one surface of the dielectric substrate, placed in a region other than a region where the plurality of resonant elements is placed, and transmitting visible light, wherein a size of the dummy pattern is 0.1 times or less of a wavelength of the electromagnetic waves.

[2]

A transparent electromagnetic waves controlling member transmitting visible light and controlling a reflection direction or a transmission direction of electromagnetic waves in a particular frequency band, the transparent electromagnetic waves controlling member comprising:

a dielectric substrate transmitting visible light;

a plurality of resonant elements placed on at least one surface of the dielectric substrate, transmitting visible light and resonating with the electromagnetic waves; and a dummy pattern placed on at least one surface of the dielectric substrate, placed in a region other than a region where the plurality of resonant elements is placed, transmitting visible light, and including non-conductive material.

[3]

The transparent electromagnetic waves controlling member according to [1] or [2], wherein a visible light transmittance of a region where the plurality of resonant elements is placed, and a visible light transmittance of a region where the dummy pattern is placed are approximately equal.

[4]

The transparent electromagnetic waves controlling member according to any one of [1] to [3], wherein the resonant element includes a mesh structure.

[5]

The transparent electromagnetic waves controlling member according to [4], wherein an aperture ratio of a metal mesh constituting the resonant element, and an aperture ratio of a region where the dummy pattern is placed are approximately equal.

[6]

The transparent electromagnetic waves controlling member according to [1], wherein the resonant element and the dummy pattern include same material.

[7]

The transparent electromagnetic waves controlling member according to [1], wherein the dummy pattern includes non-conductive material.

[8]

The transparent electromagnetic waves controlling member according to any one of [1] to [7], wherein a protective member transmitting visible light is placed on at least one surface of the dielectric substrate so as to cover the resonant element.

[9]

The transparent electromagnetic waves controlling member according to any one of [1] to [8], wherein a grounding layer is included on the dielectric substrate, on a surface opposite side to the resonant element.

[10]

A transparent substrate with a transparent electromagnetic waves controlling member comprising:

a transparent substrate; and the transparent electromagnetic waves controlling member according to any one of [1] to [9] placed on one surface of the transparent substrate.

REFERENCE SIGNS LIST

1: transparent electromagnetic waves controlling member
2: dielectric substrate
3: resonant element
4: dummy pattern
a: size of dummy pattern
b: distance between adjacent dummy patterns

The invention claimed is:

1. A transparent electromagnetic waves controlling member a dielectric substrate transmitting visible light;

a plurality of resonant elements placed on at least one surface of the dielectric substrate, transmitting visible light and resonating with the electromagnetic waves; and one or more dummy patterns placed on at least one surface of the dielectric substrate, placed in a region other than a region where the plurality of resonant elements is placed, and transmitting visible light, wherein a size of the dummy pattern is 0.1 times or less of a wavelength of the electromagnetic waves, and wherein a grounding layer is included on the dielectric substrate, on a surface opposite side to the resonant element.

2. The transparent electromagnetic waves controlling member according to claim 1, wherein a visible light transmittance of a region where the plurality of resonant elements is placed, and a visible light transmittance of a region where the dummy pattern is placed are approximately equal.

3. The transparent electromagnetic waves controlling member according to claim 1, wherein the resonant element includes a mesh structure.

4. The transparent electromagnetic waves controlling member according to claim 3, wherein an aperture ratio of a metal mesh constituting the resonant element, and an aperture ratio of a region where the dummy pattern is placed are equal.

5. The transparent electromagnetic waves controlling member according to claim 1, wherein the resonant element and the dummy pattern include the same material.

6. The transparent electromagnetic waves controlling member according to claim 1, wherein a protective member transmitting visible light is placed on at least one surface of the dielectric substrate so as to cover the resonant element.

7. A transparent substrate with a transparent electromagnetic waves controlling member comprising:

a transparent substrate; and the transparent electromagnetic waves controlling member according to claim 1 placed on one surface of the transparent substrate.

8. A transparent electromagnetic waves controlling member comprising:

a dielectric substrate transmitting visible light;

a plurality of resonant elements placed on at least one surface of the dielectric substrate, transmitting visible light and resonating with the electromagnetic waves; and one or more dummy patterns placed on at least one surface of the dielectric substrate, placed in a region other than a region where the plurality of resonant elements is placed, transmitting visible light, and including non-conductive material, and wherein a grounding layer is included on the dielectric substrate, on a surface opposite side to the resonant element.

9. The transparent electromagnetic waves controlling member according to claim 8, wherein a visible light transmittance of a region where the plurality of resonant elements is placed, and a visible light transmittance of a region where the dummy pattern is placed are equal.

10. The transparent electromagnetic waves controlling member according to claim 8, wherein the resonant element includes a mesh structure.

11. The transparent electromagnetic waves controlling member according to claim 10, wherein an aperture ratio of a metal mesh constituting the resonant element, and an aperture ratio of a region where the dummy pattern is placed are equal.

12. The transparent electromagnetic waves controlling member according to claim 8, wherein a protective member transmitting visible light is placed on at least one surface of the dielectric substrate so as to cover the resonant element.

13. A transparent substrate with a transparent electromagnetic waves controlling member comprising:

a transparent substrate; and the transparent electromagnetic waves controlling member according to claim 8 placed on one surface of the transparent substrate.

* * * * *